US012766761B2

(12) United States Patent
Brandt et al.

(10) Patent No.: US 12,766,761 B2
(45) Date of Patent: Oct. 20, 2026

(54) PATTERNED FIBRE FABRICS FOR A WIND TURBINE BLADE PREFORM

(71) Applicant: LM WIND POWER A/S, Kolding (DK)

(72) Inventors: Frederik Brandt, Kolding (DK); Kristian Madsen, Kolding (DK); Michael Koefoed, Kolding (DK)

(73) Assignee: LM Wind Power A/S, Kolding (DK)

( * ) Notice: Subject to any disclaimer, the term of this patent is extended or adjusted under 35 U.S.C. 154(b) by 50 days.

(21) Appl. No.: 18/692,041

(22) PCT Filed: Oct. 13, 2022

(86) PCT No.: PCT/EP2022/078532
§ 371 (c)(1),
(2) Date: Mar. 14, 2024

(87) PCT Pub. No.: WO2023/066787
PCT Pub. Date: Apr. 27, 2023

(65) Prior Publication Data
US 2025/0135685 A1 May 1, 2025

(30) Foreign Application Priority Data
Oct. 18, 2021 (EP) .................................... 21203133

(51) Int. Cl.
*B29B 11/16* (2006.01)
*B29D 99/00* (2010.01)

(52) U.S. Cl.
CPC .......... *B29B 11/16* (2013.01); *B29D 99/0028* (2013.01)

(58) Field of Classification Search
CPC ...... F03D 1/06; F03D 1/0675; F05B 2220/30; F05B 2230/232; F05B 2240/301; F05B 2280/4002; F05B 2280/6012; B29B 11/16; B29D 99/0028
See application file for complete search history.

(56) References Cited

U.S. PATENT DOCUMENTS

2004/0142143 A1* 7/2004 Corden ................. B29C 70/541 428/104
2009/0269557 A1* 10/2009 Stiesdal ............. B29D 99/0025 156/305
2011/0211971 A1* 9/2011 Bendel .................. F03D 1/0675 416/241 R (Continued)

FOREIGN PATENT DOCUMENTS

WO 02088231 A1 11/2002
WO 2014166493 A1 10/2014
WO 2017148514 A1 9/2017

(Continued)

*Primary Examiner* — Nathaniel E Wiehe
*Assistant Examiner* — Joshua R Beebe
(74) *Attorney, Agent, or Firm* — Dority & Manning, P.A.

(57) ABSTRACT

The present invention relates a method of manufacturing a wind turbine blade (10) part using a preform (98). A plurality of layers are arranged within a preform mould (90) to form a stack of layers, wherein one or more of the layers is formed by an elongate fabric (70) comprising a fibre material treated with a binding agent. The elongate fabric comprises an alternating pattern of first sections of fibre material free from binding agent and second sections of fibre material treated with binding agent.

15 Claims, 5 Drawing Sheets

(56) References Cited

U.S. PATENT DOCUMENTS

Figure 1:
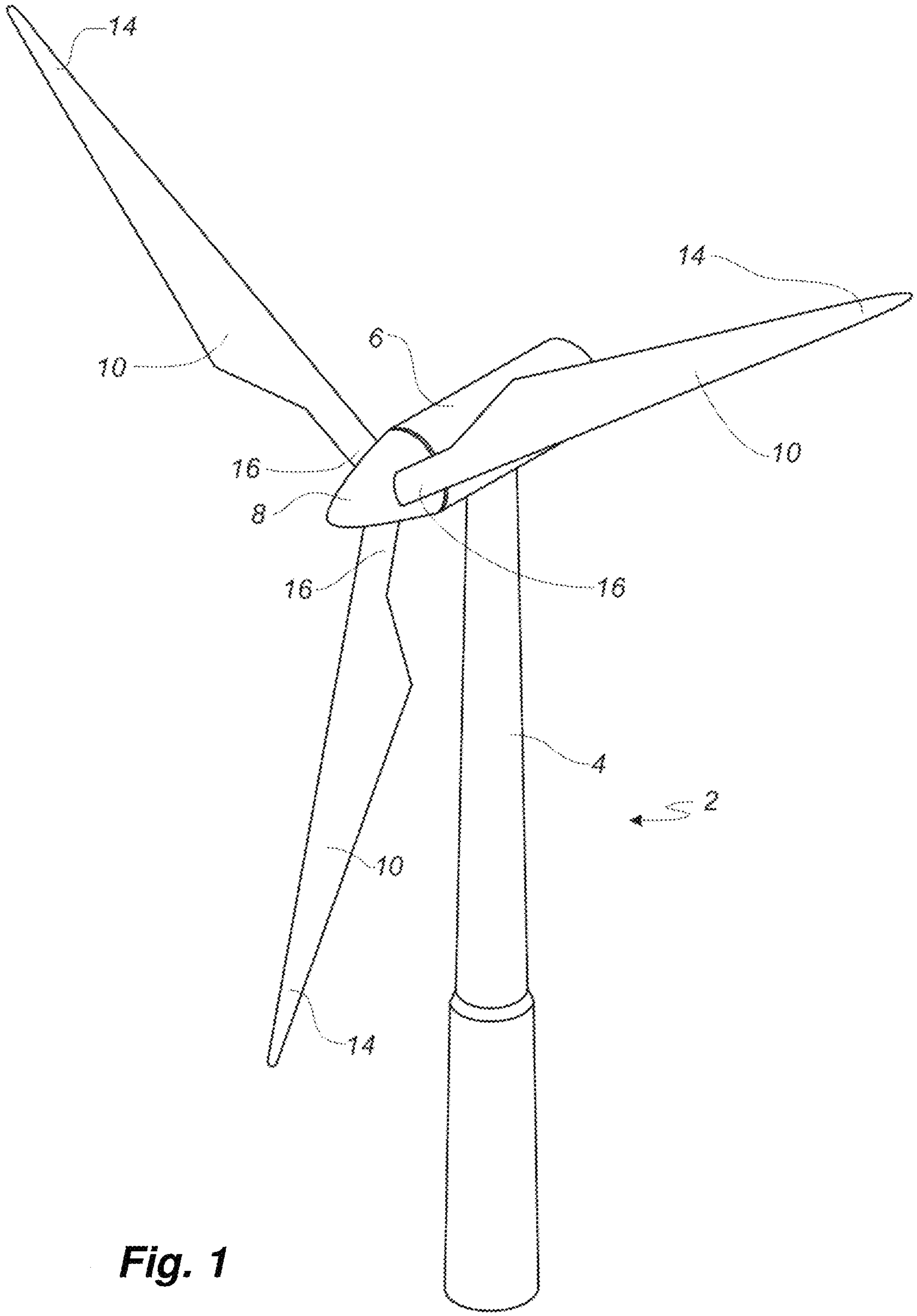

| | | | | |
|---|---|---|---|---|
| 2011/0243750 | A1* | 10/2011 | Gruhn | B29C 70/083 416/226 |
| 2020/0398459 | A1* | 12/2020 | Kristian Lehmann Madsen | B29C 70/42 |

FOREIGN PATENT DOCUMENTS

| | | | | |
|---|---|---|---|---|
| WO | 2019115337 | A1 | 6/2019 | |
| WO | 2020169160 | A1 | 8/2020 | |
| WO | 2020173929 | A1 | 9/2020 | |
| WO | WO-2021223887 | A1 * | 11/2021 | B29C 70/48 |

* cited by examiner

PATTERNED FIBRE FABRICS FOR A WIND TURBINE BLADE PREFORM

This is a National Phase Application filed under 35 U.S.C. 371 as a national stage of PCT/EP2022/078532, filed Oct. 13, 2022, an application claiming the benefit of European Application No. 21203133.0, filed Oct. 18, 2021, the content of each of which is hereby incorporated by reference in its entirety.

FIELD OF THE INVENTION

The present invention relates to a method of manufacturing a wind turbine blade part, and to a preform for manufacturing the wind turbine blade part.

BACKGROUND OF THE INVENTION

Wind power provides a clean and environmentally friendly source of energy. Wind turbines usually comprise a tower, generator, gearbox, nacelle, and one or more rotor blades. The wind turbine blades capture kinetic energy of wind using known airfoil principles. Modern wind turbines may have rotor blades that exceed 90 meters in length.

Wind turbine blades are usually manufactured by forming two shell parts or shell halves from layers of fibre material and resin. Spar caps or main laminates are placed or integrated in the shell halves and may be combined with shear webs or spar beams to form structural support members. Spar caps or main laminates may be joined to, or integrated within, the inside of the suction and pressure side halves of the shell.

The shell halves of wind turbine blades are usually manufactured using blade moulds. First, a blade gel coat or primer is applied to the mould. Subsequently, fibre reinforcement and/or fabrics are placed into the mould followed by resin infusion. A vacuum is typically used to draw resin material into a mould. Alternatively, prepreg technology can be used in which a fibre or fabric pre-impregnated with resin forms a homogenous material which can be introduced into the mould. Several other moulding techniques are known for manufacturing wind turbine blades, including compression moulding and resin transfer moulding. The shell halves are assembled by being glued or bolted together substantially along a chord plane of the blade.

In the above-described manufacturing process, preforms may be used. A preform is a shaped arrangement of fibres, such as multiple fibre layers, which has been bound and/or consolidated for later use as part of the fibre lay-up in the blade mould. The rationale for using preforms for blade manufacturing is to reduce cycle time in the blade mould. Also, using preforms may reduce the number of required repairs due to the pre-consolidated structure of the preforms.

However, the manufacturing of preforms for wind turbine blades, for example for a root region of the blade, can be quite challenging due to the ever increasing dimensions of both the blades and the preforms thereof. Manufacturing preforms or different shapes and sizes can be time-consuming and expensive, especially when complex and/or curved surfaces must be formed as part of the preform.

Known methods for preform manufacturing involve laying a number of fibre layers into a preform mould in combination with a binding agent, which can be used to bind the fibres and/or the layers together, and using a subsequent heating step to finalize the preform. In particular when manufacturing relatively long and curved preforms, these known methods suffer from poor drapability, i.e. insufficient ability of the fibre layers to conform to the surface of the preform mould. This often results in the formation of wrinkles and other defects which negatively impact the quality of the preform and thus ultimately of the wind turbine blade.

It is thus a first object of the present invention to provide a more efficient way of manufacturing preforms for wind turbine blade parts.

It is a further object of the present invention to provide a method of manufacturing preforms for a wind turbine blade which results in a reduction or elimination of the formation of wrinkles or other defects in the fibre lay-up of the preform.

It is another object of the present invention to provide a preform with an improved structural integrity and a wind turbine blade comprising said preform.

SUMMARY OF THE INVENTION

The present inventors have found that one or more of said objects may be achieved by providing a method of manufacturing a wind turbine blade part, the method comprising:

- providing a preform mould,
- arranging a plurality of layers within the preform mould to form a stack of layers, wherein one or more of the layers is formed by a fabric, preferably an elongate fabric, comprising a fibre material treated with a binding agent, the fabric comprising an
- alternating pattern of first sections of fibre material free from binding agent and second sections of fibre material treated with binding agent,
- heating the stack of layers to form a preform,
- transferring the preform to a blade mould comprising a mould cavity,
- infusing resin to the blade mould cavity,
- curing and/or hardening the resin in order to form the blade part.

The present inventors have found that this method allows for a considerably more effective manufacturing process of wind turbine blade preforms. By providing one or more of the layers as the above-described patterned fabric a significantly increased drapability is obtained. This results in improved quality of the preform, less wrinkle formation and a reduction in layup time in the preform mould. In particular, the preform of the present invention may comprise one or more of the patterned fabrics, i.e. fabrics comprising an alternating pattern of first sections of fibre material free from binding agent and second sections of fibre material treated with binding agent, and one or more non-patterned fabrics each comprising fibre material with evenly or randomly applied binding agent. It is particularly preferred that one or both of the outer layers of the stack are formed by a patterned fabric and that one or more of the inner layers of the stack are formed by a non-patterned fabric.

The wind turbine blade part of the present invention may preferably be a shell half, such as a pressure side shell half or a suction side shell half. The preform mould usually comprises a preform moulding surface, such as a curved preform moulding surface. The preform mould may have a length of at least 15 meters, such as at least 30 meters.

A plurality of layers, such as fibre layers, are arranged within the preform mould to form a stack of layers. It is preferred that at least five layers, such as at least ten layers, for example 10-30 layers, are arranged within the preform mould to form a stack of layers. One or more of the layers, such as all of the layers, are preferably fibre layers, such as fibre fabrics. The layers may include one or more uniaxial fibre mats and one or more biaxial fibre mats. Preferably, at least one of patterned fabrics of the stack is a uniaxial fibre mat. Also, preferably, at least one of the non-patterned fabrics of the stack is a biaxial fibre mat.

One or more of the layers, preferably two or more of the layers, are formed by a fabric, preferably an elongate fabric, comprising a fibre material treated with a binding agent, such as a UD fabric or a fabric on a roll. The fibre material being treated with the binding agent may include the fibre material being contacted or being impregnated with the binding agent. For example, a top surface of the elongate fabric may be contacted or impregnated with the binding agent, for example by applying the binding agent to the top surface in powder form or in liquid form. Thus, the pattern of binding agent is preferably provided at least on the top surface and/or on the bottom surface of the patterned fabric.

The fabric usually has a length extending along the longitudinal direction of the fabric, a width and a thickness. Likewise, the preform has a length extending along the longitudinal direction of the preform, a width and a thickness, wherein usually the longitudinal direction of the fabric coincides with the longitudinal direction of the preform. The preform is preferably an elongate preform. Thus, the width and the thickness of the elongate fabric or preform are less than its length or longitudinal extent. The elongate fabric and/or the elongate preform will typically have a length of at least 10 meters, such as at least 15 meters, preferably at least 20 meters. When arranged in the blade mould, the length or longitudinal extent of the preform will typically be aligned with the spanwise direction of the wind turbine blade.

The fabric may be a fibre mat, such as a glass fibre mat, preferably a uniaxial glass fibre mat. The fabric comprises an alternating pattern of first sections, preferably strips, of fibre material free from binding agent and second sections, preferably strips, of fibre material treated with binding agent. The binding agent may be applied in this alternating pattern in the form of a powdered binding agent that is spread using a powder applicator or scattering device. Preferably, the alternating pattern is created by applying powdered binding agent only on selected parts of the elongate fabric. In a preferred embodiment, the alternating pattern is a stripe pattern. In a preferred embodiment, the first and second sections are respective regions on the top or bottom surface of the patterned fabric. Thus, the top surface and/or bottom surface of the patterned fabric may comprise alternating surface regions with and without binding agent applied to said surface.

The stack of layers may comprise at least two of the elongate fabrics comprising the alternating pattern, for example forming the lowermost layer and the uppermost layer of the stack. In addition, one or more additional elongate fabrics comprising the alternating pattern may be used within the stack. In a preferred embodiment, the stack of layers comprises three or more of the elongate fabrics comprising the alternating pattern, for example all three or more of the elongate fabrics forming the lowermost three or more layers or the uppermost three or more layers of the stack.

The fibre laying step to form the stack of layers of the preform will typically comprise the use of one or more fibre lay-up devices. Usually, the method comprises a step of heating the fibre material and the binding agent to form a preform. Preferably, the fibre material and the binding agent are heated using one or more heating devices, such as an oven. Preferably, a binding agent is added to the fibres prior to the heating step. In the preform, such binding agent is preferably present in an amount of 0.1-15 wt % relative to the weight of the fibre material. The binding agent may also be present in an amount of 2-50 gram per square meter of glass surface of the preform, preferably 5-30 gram per square meter.

Typically, the various layers are placed successively onto a moulding surface of the preform mould. The fibre material of the layers may comprise glass fibres, carbon fibres or a combination thereof. For each patterned fabric or for each non-patterned layer of the stack, the fibre material may advantageously be brought into contact with a binding agent before or during the fibre lay-up. In some embodiments, the fibre material may include fibre rovings, such as glass fibre rovings. In some embodiments, multiple layers of fibre rovings or roving bundles are successively placed into each preform mould. In some embodiments, the various layers are laid from glass fibre supplied on rolls.

The binding agent can be added simultaneously with the fibre layers or subsequently to fibre lay-up. In the preform, the binding agent is preferably present in an amount of 0.1-15 wt % relative to the weight of the fibre material. The binding agent may also be present in an amount of 5-40, preferably 10-20, gram per square meter of glass surface of the preform. In preferred embodiments, the binding agent is present in an amount of 0.5-5 wt %, preferably 0.5-2.5 wt %, relative to the weight of the fibre material. Advantageously, the binding agent is a thermoplastic binding agent. The binding agent may preferably comprise a polyester, preferably a bisphenolic polyester. In some embodiments, the binding agent comprises a vinyl ester.

In a preferred embodiment, the heating of the stack of layers takes place at a temperature of between 4° and 160° C., preferably between 9° and 160° C. An example of a suitable binding agent is a polyester marketed under the name NEOXIL 940. Examples include NEOXIL 940 PMX, NEOXIL 940 KS 1 and NEOXIL 940 HF 2B, all manufactured by DSM Composite Resins AG. Another example is a polyester resin marketed under the name C.O.I.M. FILCO® 661 FPG 005, which is a bisphenolic unsaturated polyester resin in powder form. Preferably, the binding agent is a polyester, preferably a bisphenolic polyester. In other embodiments, the binding agent is a hotmelt adhesive or based on a prepreg resin.

According to another embodiment, the binding agent is a thermoplastic binding agent. Typically, the layers of the stack are at least partially joined together by means of the binding agent by thermal bonding. In a preferred embodiment, the binding agent is a binding powder, such as a thermoplastic binding powder.

The stack of layers can then be heated to consolidate and fix the layers to form the preform. In addition, the stack of layers can be subjected to vacuum together with the heating step. The preform can then be transferred to a blade mould comprising a mould cavity, for example a mould cavity for forming a blade shell half, such as a suction side shell half or a pressure side shell half. Typically, a plurality of preforms manufactured according to the method of the present invention are arranged in the mould cavity, optionally together with other fibre material and/or core materials. Resin is infused into the blade mould cavity to impregnate the preforms and the other material, followed by curing and hardening the resin in order to form the blade part, such as the blade shell half.

The resin for injecting the preform during the manufacturing of wind turbine blade parts, such as a root laminate, may be an epoxy, a polyester, a vinyl ester or another suitable thermoplastic or duroplastic material. In other embodiments, the resin may be a thermosetting resin, such as epoxy, vinyl ester or polyester, or a thermoplastic resin, such as nylon, PVC, ABS, polypropylene or polyethylene.

In a preferred embodiment, the first and second sections are formed as bands, preferably parallel bands. In another preferred embodiment, the first and second sections are formed as strips, preferably parallel strips. It is preferred, the elongate fabric has a longitudinal direction, i.e. the length dimension of the elongate fabric, and said strips or bands are oriented substantially parallel to the longitudinal direction of the elongate fabric. Thus, the strips or bands are preferably parallel to each other and aligned along the length direction of the elongate preform. Such arrangements have been found to result in particularly good drapeability of the preform on the preform mould, in particular when the preform mould comprises a curved moulding surface.

Each strip or band may have a width of 10-300 mm, such as width of 50-200 mm. Preferably, each strip of band extends throughout the entire length of the patterned fabric. The strips or bands forming regions of fibres treated with the binding agent may penetrated the entire thickness of the patterned fabric, i.e. may extend between the top surface and the bottom surface of the patterned fabric.

In a preferred embodiment, the patterned fabric has a thickness of 0.3-0.8 mm, preferably 0.4-0.7 mm. It has been found that the alternating pattern of first sections of fibre material free from binding agent and second sections of fibre material treated with binding agent has a particular impact on the improved drapability of such comparatively thin elongate fabrics, such as uniaxial glass fibre mats.

In a preferred embodiment, the binding agent is present in the elongate fabric at a level of 1-10 $g/m^2$, more preferably 2-8 $g/m^2$, most preferably 3-7 $g/m^2$. It is preferred that the ratio of first sections of fibre material free from binding agent and second sections of fibre material treated with binding agent is between 1:3 to 3:1, more preferably between 1:2 to 2:1, in terms of surface area.

In a preferred embodiment, the weight ratio of fibre material to binding agent in the elongate fabric is between 50:1 and 300:1, more preferably 100:1 to 200:1.

Preferably, the preform comprises at least 10 layers. Preferably, at least two of the layers of the preform are formed by the patterned elongate fabric of the present invention.

In a preferred embodiment, the binding agent is provided as a powder. Preferably, the binding agent comprises a polyester and/or a vinyl ester. In a preferred embodiment, the binding agent is an unsaturated polyester powder resin In some embodiments, the fibre material of the elongate fabric is a uniaxial fibre material. In a preferred embodiment, the fibre material of the elongate fabric is a biaxial fibre material. Typically, the preform of the present invention comprises both uniaxial and biaxial fibre layers.

In a preferred embodiment, the elongate fabric is a fibre mat, such as a glass fibre mat. In some embodiments, the preform and the elongate fabric each have a length of between 15 and 50 m. In a preferred embodiment, 10-50 layers are arranged within the preform mould to form the stack of layers.

It is particularly preferred that the patterned elongate fabric forms the lowermost layer of the stack of layers. In some embodiments, a patterned elongate fabric forms the lowermost and another patterned elongate fabric forms the uppermost layer of the stack of layers.

In a preferred embodiment, at least 5% of all layers of the stack of layers is formed by the elongate fabric, such as at least 10%. Preferably, the preform comprises at least two of the patterned elongate fabrics of the present invention. In a preferred embodiment, one or more of the layers of the stack is formed by a sheet comprising a fibre material treated with a binding agent, wherein the binding agent is distributed uniformly across the sheet. Thus, the stack preferably comprises one or more of the patterned elongate fabrics of the present invention and one or more layers, preferably fibre layers, that include the binding agent distributed uniformly across the layer. For example, the uppermost and/or lowermost layer of the stack is a patterned elongate fabric of the present invention and the layers in between the lowermost and the uppermost layers include a sheet wherein the binding agent is distributed uniformly across the sheet. Such arrangement is found to result in a particularly advantageous combination of good drapability and satisfactory curability and consolidation of the preform, as well as proper adhesion between the layers to allow for lifting of the entire preform without delamination.

In a preferred embodiment, the sheet comprising a fibre material treated with a binding agent, wherein the binding agent is distributed uniformly across the sheet, has a thickness of 1-2 mm, preferably 0.9-1.6 mm.

In another aspect, the present invention relates to a preform, preferably an elongate preform, for a wind turbine blade part, the preform comprising a plurality of layers consolidated to a stack of layers, wherein one or more of the layers is formed by an elongate fabric comprising a fibre material treated with a binding agent, the elongate fabric comprising an alternating pattern of first sections of fibre material free from binding agent and second sections of fibre material treated with binding agent.

In a preferred embodiment, the first and second sections are formed as bands or strips. In a preferred embodiment, the elongate fabric has a longitudinal direction and said strips or bands are oriented substantially parallel to the longitudinal direction of the elongate fabric. In a preferred embodiment, the elongate fabric forms the lowermost and/or the uppermost layer of the stack of layers Typically, the preform is a consolidated arrangement of material comprising fibres, such as glass fibres, and a binding agent. The preform will typically be used for manufacturing a blade half of a wind turbine blade. The preforms can be used in a subsequent blade moulding process as part of the fibre lay-up in the blade mould, such as a blade half mould. The preforms manufactured according to the present invention could be placed within the root region of a blade mould, thus constituting part of the root laminate. The root region may correspond to a region of the blade having a substantially circular or elliptical cross-section. However, the preforms could also be used for other parts and regions of a wind turbine blade, such as trailing edge or leading edge reinforcements or adhesive flanges. Alternatively, the preforms could be used for a full blade layup.

In a preferred embodiment, at least one of the surfaces of the preform, such as the bottom surface of the preform, is curved. In some embodiments, at least one of the surfaces of the preform has a double curvature. In another embodiment, at least one of the surfaces of the preform, such as the bottom surface of the preform, is curved, arcuate, undulated or generally U-shaped. In one embodiment, the two corners of the upper edge of the preform are connected by an at least partly curved, arcuate, undulated or generally U-shaped path. In a preferred embodiment, the curvature of a surface of the preform corresponds to a cross sectional profile of a wind turbine blade half or a part thereof. It is preferred that the preform has a concave, or inwardly curved, surface.

In some embodiments, the preform has a length-width ratio of at least 5:1. In other embodiments, the preform has a length-width ratio of at least 5:1, such as at least 10:1. In a preferred embodiment, the preform has a length-width ratio of at least 7:1.

In a preferred embodiment, each of the preforms obtainable by the preform mould of the present invention is configured to form a blade section starting from the root end of the wind turbine blade. Thus, preferably each of the preforms obtainable by the preform mould of the present invention is configured to be arranged at the root end of the blade mould. Most preferably, the preform obtainable by the preform mould of the present invention is configured to form a subsection of the root section extending from the root end of the blade together with other subsections of the root section equally extending from the root end of the blade.

In one embodiment, the preforms of the present invention essentially consist of the fibre material and the binding agent. This means that the preforms contain no more than 10 wt %, preferably not more than 5 wt % or not more than 1 wt %, of material other than fibre material and binding agent relative to the total weight of the preform. According to another embodiment, the preform consists of the fibre material and the binding agent.

In another embodiment, the fibre material used for the preforms of the present invention essentially consists of glass fibres. This means that the fibre material contains not more than 10 wt %, preferably not more than 5 wt % or not more than 1 wt %, of material other than glass fibres relative to the total weight of the fibre material. According to another embodiment, the fibre material consists of glass fibres.

In one embodiment, the binding agent is present in an amount of 1-6 wt % relative to the weight of the fibre material. According to another embodiment, the melting point of the binding agent is between 40° and 220° C., preferably between 4° and 160° C. According to another embodiment, the binding agent comprises a polyester, preferably a bisphenolic polyester.

In one embodiment of the present invention, each preform essentially consists of the fibre material and the binding agent. According to another embodiment, one or more of the layers of the stack comprises fibre rovings, preferably glass fibre rovings. In other embodiments, the fibre material may comprise carbon fibres or a hybrid material. According to another embodiment, the stack comprises several fibre fabrics, such as a fibre mats, wherein one or more of said fibre fabrics is formed by the patterned elongate fabric of the present invention.

In a preferred embodiment, the preforms manufactured according to the afore-mentioned method are used as part of the root region of a wind turbine blade, such as the root laminate. The root region may extend up to 40 meters, such as up to 25 meters, from the root end of the blade, as seen in its longitudinal direction. In other embodiments, the root region may extend to the shoulder of the blade +/−5 meters. However, the preforms could also be used for other parts and regions of a wind turbine blade. In other embodiments, the preforms manufactured according to the afore-mentioned method are used over a length of 10-35% of the total blade length. In another embodiment, the preforms manufactured according to the afore-mentioned method are used in a region of the blade extending between its root end and a shoulder of the blade.

All features and embodiments described above with respect to the method of manufacturing a wind turbine blade part likewise apply to the preform and to the blade (part) of the present invention and vice versa.

In another aspect, the present invention relates to a wind turbine blade or a wind turbine blade part obtainable by the method of the present invention, and to a wind turbine blade comprising a wind turbine blade part obtainable by the method of the present invention. Such wind turbine blade has improved structural characteristics as the inventive method implies a significantly increased drapability and thus an improved quality of the preform, such as less wrinkle formation during preform manufacturing and subsequent blade manufacturing.

As used herein, the term “longitudinal” means an axis or direction running substantially parallel to the maximum linear dimension of the element in question, for example an elongate fabric or a preform.

As used herein, the term “elongate”, such as in “elongate fabric” or “elongate preform”, refers to an element, such as a fabric or a preform, having two dimensions that are much less than a third dimension, such as at least three, five, ten or twenty times less than a third dimension. Typically, the third dimension will be the length (longitudinal extension) of the preform, as opposed to the two lesser dimensions, width and height (thickness). The length (longitudinal extension) of the preform or of the patterned fabric will typically be aligned with the spanwise direction of the wind turbine blade.

As used herein the term “fabric” means a material comprising a network of fibres including, but not limited to, woven or knitted materials, tufted or tufted-like materials, nonwoven webs.

As used herein, the term “wt %” means weight percent. The term “relative to the weight of the fibre material” means a percentage that is calculated by dividing the weight of an agent, such as a binding agent, by the weight of the fibre material. As an example, a value of 1 wt % relative to the weight of the fibre material corresponds to 10 g of binding agent per kilogram of fibre material.

DETAILED DESCRIPTION OF THE INVENTION

Figure 2:
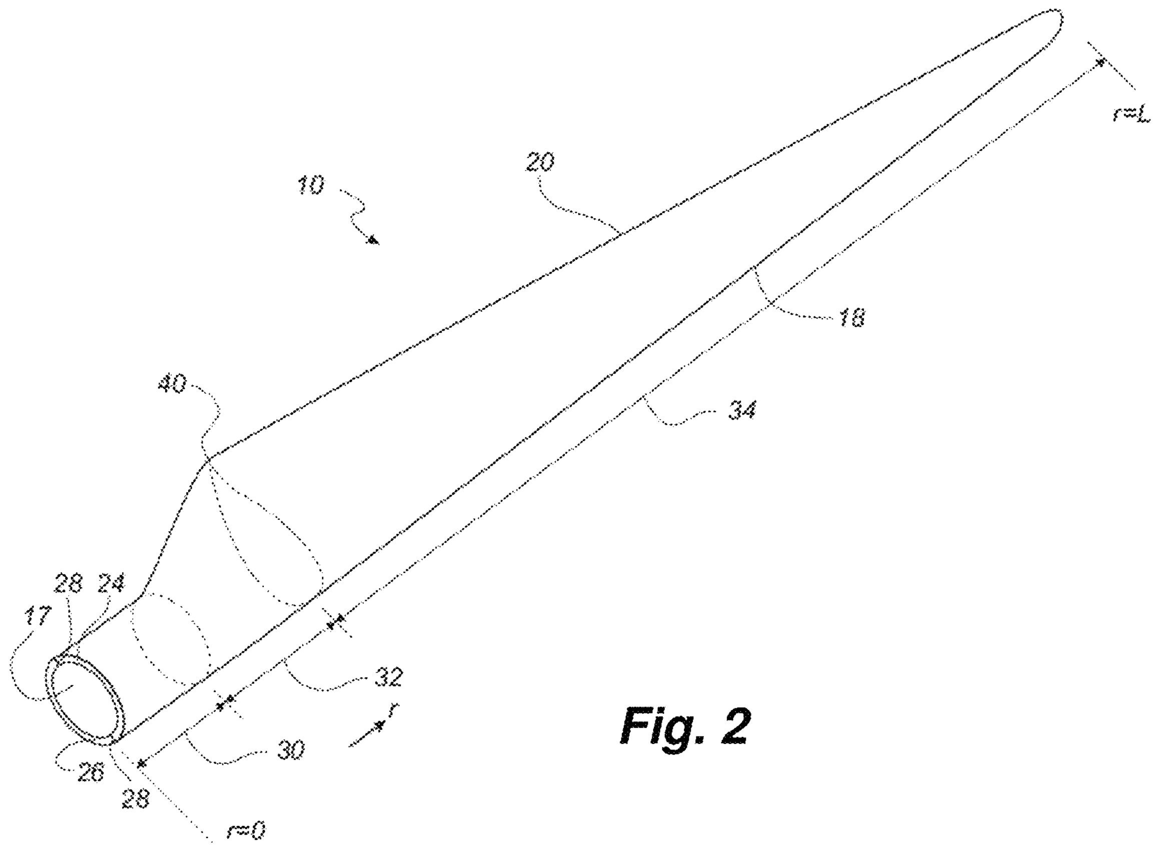
Figure 3:
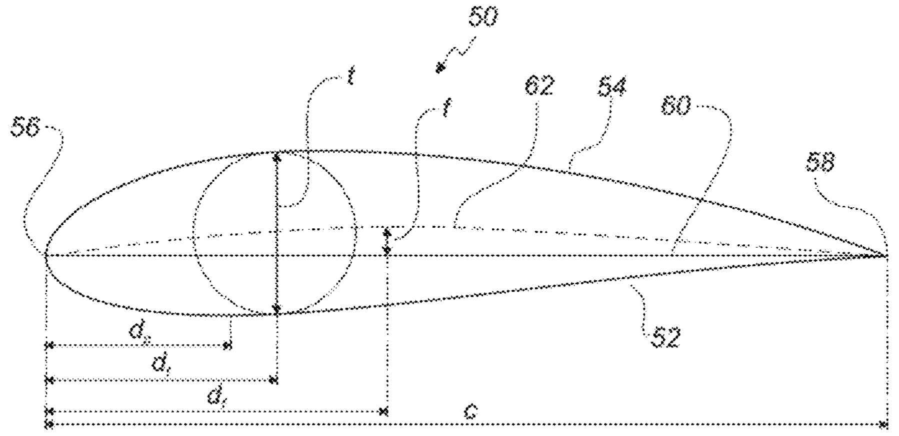
Figure 4:
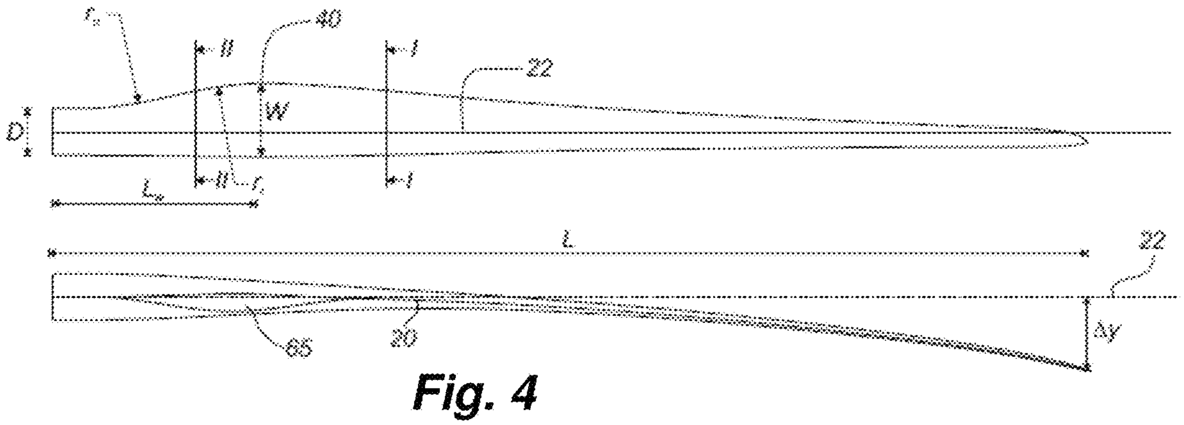
Figure 5:
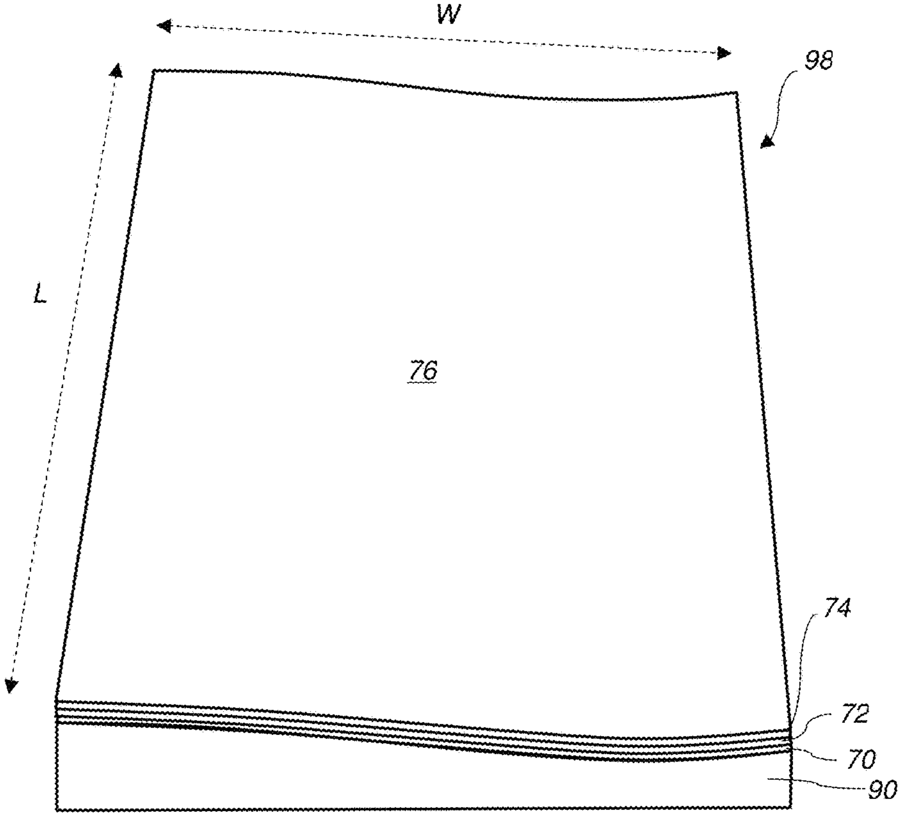
Figure 6:
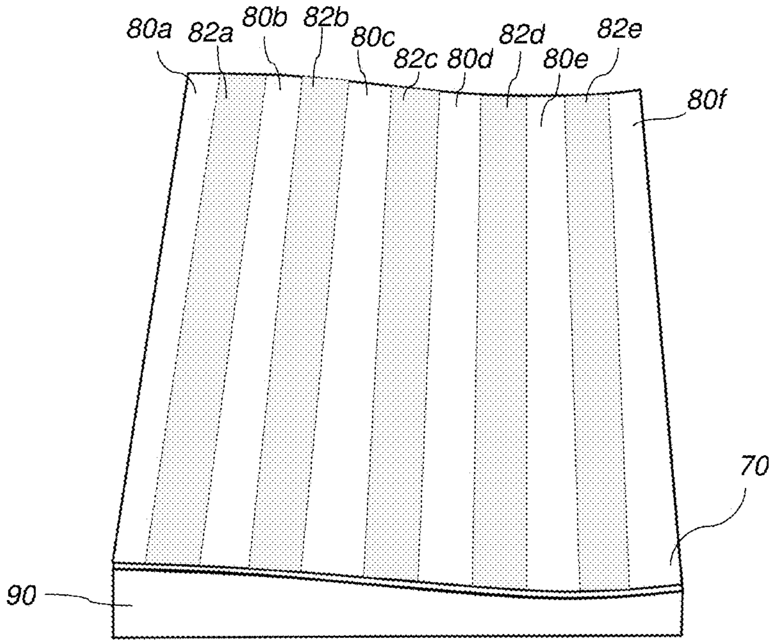
Figure 7:
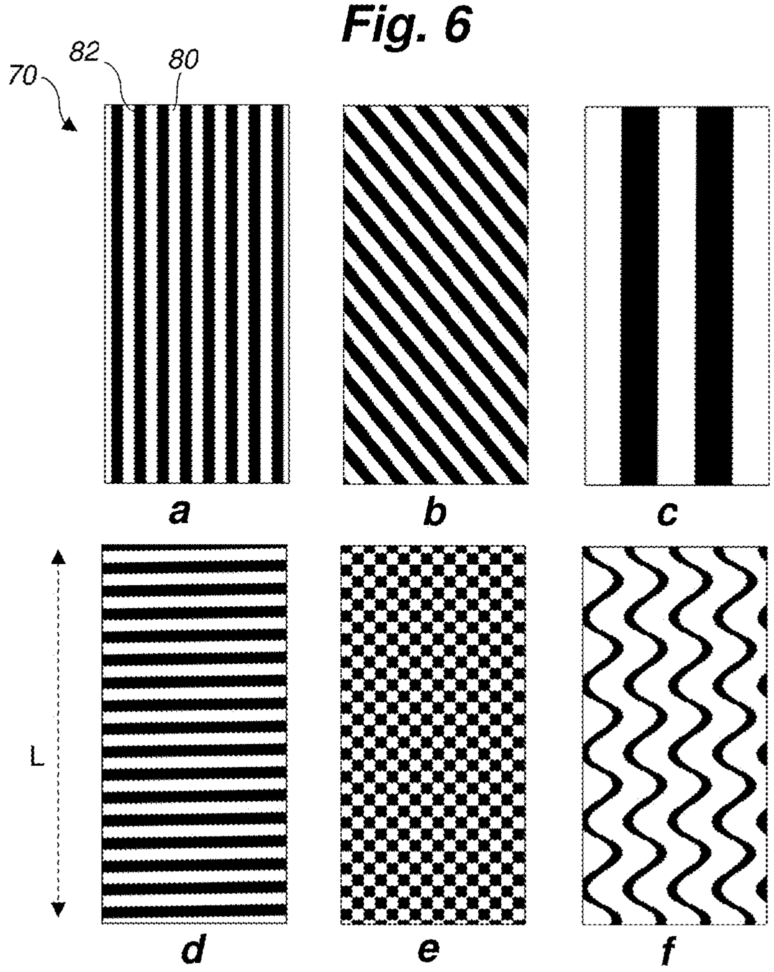
Figure 8:
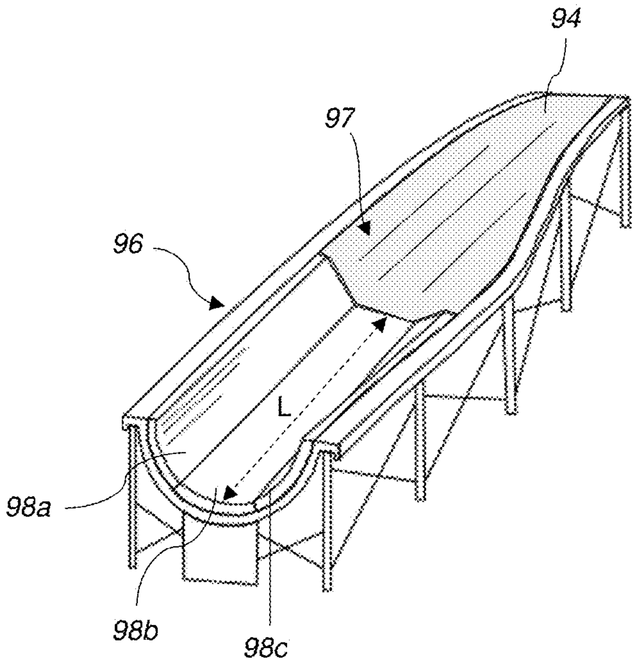

The invention is explained in detail below with reference to embodiments shown in the drawings, in which FIG. 1 shows a wind turbine, FIG. 2 shows a schematic view of a wind turbine blade, FIG. 3 shows a schematic view of an airfoil profile through section I-I of FIG. 4, FIG. 4 shows a schematic view of the wind turbine blade, seen from above and from the side, FIG. 5 is a perspective view of a preform mould and a layered preform, FIG. 6 is a perspective view of a preform mould and a fibre fabric according to the present invention, FIG. 7 is a schematic top view showing various patterns of a fibre fabric according to the present invention, and FIG. 8 is a perspective drawing of a blade mould for lay up of preforms according to the present invention.

DETAILED DESCRIPTION

FIG. 1 illustrates a conventional modern upwind wind turbine according to the so-called “Danish concept” with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

FIGS. 3 and 4 depict parameters which are used to explain the geometry of the wind turbine blade according to the invention. FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows other geometric parameters of the blade. The blade has a total blade length L. As shown in FIG. 3, the root end is located at position r=0, and the tip end located at r=L. The shoulder 40 of the blade is located at a position $r=L_w$, and has a shoulder width W, which equals the chord length at the shoulder 40. The diameter of the root is defined as D. The curvature of the trailing edge of the blade in the transition region may be defined by two parameters, viz. a minimum outer curvature radius $r_o$ and a minimum inner curvature radius $r_i$, which are defined as the minimum curvature radius of the trailing edge, seen from the outside (or behind the trailing edge), and the minimum curvature radius, seen from the inside (or in front of the trailing edge), respectively. Further, the blade is provided with a prebend, which is defined as Δy, which corresponds to the out of plane deflection from a pitch axis 22 of the blade.

FIG. 5 is a perspective view of a preform mould and a layered preform according to the present invention. A plurality of layers, i.e. three layers 70, 72, 74 in the illustrated example, are arranged within the preform mould 90 to form a stack of layers. The top surface 76 of the uppermost layer 74 can be seen in FIG. 5. Each of the layers typically comprises a fibre material and optionally a binding agent. As best seen in the partially disassembled view of FIG. 6, the lowermost layer 70 of the stack is formed by an elongate fabric 70, such a uniaxial fibre mat, comprising a fibre material treated with a binding agent. The elongate fabric 70 comprises an alternating pattern of first sections 80*a-f* of fibre material free from binding agent and second sections 82*a-e* of fibre material treated with binding agent.

As shown in the illustrated embodiment of FIG. 6, the first and second sections 80 are formed as bands or strips. The length L, or longitudinal direction, of the elongated fabric 70 is illustrated in FIGS. 5 and 7. It is preferred that said strips or bands are oriented substantially parallel to the longitudinal direction L of the elongate fabric L, as seen in the top view of FIGS. 7*a* and 7*c*, which shows the top surface of the respective fabrics. Various other possible patterns of the first sections 80 (white) and second sections 82 (black) are illustrated in FIGS. 7*b, d, e* and *f*, including oblique strips, transverse strips, a checkerboard pattern and a wave pattern.

Once the entire stack is assembled, as seen in FIG. 5, the stack can be heated and/or treated under vacuum to form the final a preform 98. Each preform 98*a-c* can then be transferred to a blade mould 96 comprising a mould cavity 97, as illustrated in FIG. 8. The manufactured preforms 98*a*, 98*b*, 98*c* can be laid up in a blade mould 96 to form part of a wind turbine blade, such as the root laminate. It is particularly preferred that the preforms manufactured according to the present invention are used for a blade section starting from the root end of the blade, such as the root region. The preforms 98*a*, 98*b*, 98*c* are arranged in the blade mould cavity 97, usually together with additional fibre material 94. Then, resin is infused to the blade mould cavity 97, which is subsequently cured or hardened in order to form the blade part, such as a blade half. As seen in FIG. 8, the longitudinal direction L of the fabric 70 or of the preform 98 will typically be aligned with the longitudinal or spanwise direction of the blade.

The invention is not limited to the embodiments described herein, and may be modified or adapted without departing from the scope of the present invention.

LIST OF REFERENCE NUMERALS

2 wind turbine
4 tower
6 nacelle
8 hub
10 blade
14 blade tip
16 blade root
18 leading edge
20 trailing edge
22 pitch axis
24 first shell half
26 second shell half
30 root region
32 transition region
34 airfoil region
40 shoulder/position of maximum chord
50 airfoil profile
52 pressure side
54 suction side
56 leading edge
58 trailing edge
60 chord
62 camber line/median line
70 first layer/fabric
72 second layer/fabric
74 third layer/fabric
76 top surface of third layer/fabric
80 first section of fabric
82 second section of fabric
90 preform mould
94 fibre material
96 blade mould
97 blade mould cavity
98 preform
c chord length
$d_t$ position of maximum thickness
$d_f$ position of maximum camber
$d_p$ position of maximum pressure side camber
f camber
L blade length
L length or longitudinal direction of fabric/preform
r local radius, radial distance from blade root
t thickness
Δy prebend

The invention claimed is:

1. A method of manufacturing a wind turbine blade part, the method comprising:

providing a preform mould, arranging a plurality of layers within the preform mould to form a stack of layers, the stack of layers comprising two outer layers and one or more inner layers disposed between the two outer layers, wherein one or both of the outer layers is formed by a patterned fabric comprising a fibre material treated with a binding agent, the patterned fabric comprising an alternating pattern of first sections of fibre material free from the binding agent and second sections of fibre material treated with the binding agent, wherein the one or more inner layers are formed by a non-patterned fabric comprising the fibre material treated with the binding agent, the binding agent being evenly or randomly applied to the fibre material of the non-patterned fabric;

heating the stack of layers to form a preform, transferring the preform to a blade mould comprising a mould cavity, infusing resin to the blade mould cavity, curing and/or hardening the resin in order to form the blade part.

2. The method according to claim 1, wherein the first and second sections are formed as bands or strips.

3. The method according to claim 2, wherein the patterned fabric has a longitudinal direction and said strips or bands are oriented substantially parallel to the longitudinal direction of the patterned fabric.

4. The method according to claim 1, wherein the patterned fabric forms a lowermost and/or an uppermost layer of the stack of layers.

5. A preform for a wind turbine blade part, the preform comprising a plurality of layers consolidated to a stack of layers, wherein the plurality of layers comprises two outer layers and one or more inner layers disposed between the two outer layers, wherein one or both of the outer layers is formed by a patterned fabric comprising a fibre material treated with a binding agent, the patterned fabric comprising an alternating pattern of first sections of fibre material free from the binding agent and second sections of fibre material treated with the binding agent, wherein the one or more inner layers are formed by a non-patterned fabric comprising the fibre material treated with the binding agent, the binding agent being evenly or randomly applied to the fibre material of the non-patterned fabric.

6. The preform according to claim 5, wherein the patterned fabric has a thickness of 0.3-0.7 mm.

7. The preform according to claim 5, wherein the weight ratio of the fibre material to the binding agent in the patterned fabric is between 50:1 and 300:1.

8. The preform according to claim 5, wherein the binding agent comprises a polyester and/or a vinyl ester.

9. The preform according to claim 5, wherein the fibre material of the patterned fabric is a uniaxial fibre material.

10. The preform according to claim 5, wherein the preform and the patterned fabric each have a length of between 15 and 50 m.

11. The preform according to claim 5, wherein at least 5% of all layers of the stack of layers is formed by the patterned fabric.

12. The preform according to claim 5, wherein the first and second sections comprise bands or strips.

13. The preform according to claim 12, wherein the patterned fabric has a longitudinal direction and said bands or strips are oriented parallel to the longitudinal direction of the patterned fabric.

14. The preform according to claim 5, wherein the patterned fabric forms a lowermost and/or an uppermost layer of the stack of layers.

15. The preform according to claim 5, wherein the first and second sections define a wave pattern.

* * * * *